United States Patent
Blok et al.

(10) Patent No.: US 10,059,782 B2
(45) Date of Patent: Aug. 28, 2018

(54) FREE RADICAL GRAFTING OF FUNCTIONALIZED RESINS FOR TIRES

(71) Applicant: ExxonMobil Chemical Patents Inc., Baytown, TX (US)

(72) Inventors: Edward J. Blok, Huffman, TX (US); Ian C. Stewart, Houston, TX (US); David T. Harris, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 15/118,730

(22) PCT Filed: Mar. 6, 2015

(86) PCT No.: PCT/US2015/019200
§ 371 (c)(1),
(2) Date: Aug. 12, 2016

(87) PCT Pub. No.: WO2015/153058
PCT Pub. Date: Oct. 8, 2015

(65) Prior Publication Data
US 2017/0058058 A1 Mar. 2, 2017

Related U.S. Application Data

(60) Provisional application No. 61/972,975, filed on Mar. 31, 2014.

(51) Int. Cl.
| | | |
|---|---|---|
| *C08F 8/42* | (2006.01) |
| *B60C 1/00* | (2006.01) |
| *C08F 279/00* | (2006.01) |
| *C08F 291/02* | (2006.01) |
| *C08K 5/00* | (2006.01) |
| *C08L 9/00* | (2006.01) |
| *C08L 21/00* | (2006.01) |
| *C08L 51/04* | (2006.01) |
| *C08L 9/06* | (2006.01) |

(52) U.S. Cl.
CPC ............ *C08F 8/42* (2013.01); *B60C 1/0016* (2013.01); *C08F 279/00* (2013.01); *C08F 291/02* (2013.01); *C08K 5/0025* (2013.01); *C08L 9/00* (2013.01); *C08L 9/06* (2013.01); *C08L 21/00* (2013.01); *C08L 51/04* (2013.01)

(58) Field of Classification Search
CPC ........ C08F 8/42; C08F 279/00; C08F 291/02; B60C 1/0016; C08K 5/0025; C08L 9/00; C08L 21/00; C08L 51/04; C08L 9/06

USPC ......................................................... 523/156
See application file for complete search history.

(56) References Cited

U.S. PATENT DOCUMENTS

| | | | |
|---|---|---|---|
| 5,194,489 A | 3/1993 | Frances et al. | |
| 5,830,965 A | 11/1998 | Imaizumi et al. | |
| 6,300,449 B2 | 10/2001 | Wideman et al. | |
| 7,491,767 B2* | 2/2009 | Durel .................... | B60C 1/0016 |
| | | | 152/209.1 |
| 8,735,500 B2* | 5/2014 | Barbee .................. | C08F 232/06 |
| | | | 525/192 |
| 9,376,566 B2* | 6/2016 | Blok ....................... | B29B 9/065 |
| 2010/0113703 A1 | 5/2010 | Houjo et al. | |
| 2013/0211027 A1* | 8/2013 | Barbee .................. | C08F 232/06 |
| | | | 526/283 |
| 2014/0144573 A1* | 5/2014 | Blok ....................... | B29B 9/065 |
| | | | 156/110.1 |

FOREIGN PATENT DOCUMENTS

| | | | |
|---|---|---|---|
| EP | 0 260 103 | 3/1988 | |
| EP | 0260103 A1 * | 3/1988 | ............... C08F 8/42 |
| EP | 2 423 239 | 2/2012 | |
| FR | 2384816 | 10/1978 | |
| FR | 2384816 A1 * | 10/1978 | ............. C08J 3/203 |
| JP | 2000336152 | 12/2000 | |
| WO | 91/08240 | 6/1991 | |
| WO | WO 9108240 A1 * | 6/1991 | ............... C08F 8/42 |
| WO | WO 201012512 * | 4/2010 | ............... B60C 1/00 |
| WO | 2010/125123 | 11/2010 | |
| WO | 2010/125124 | 11/2010 | |
| WO | 2012/050667 | 4/2012 | |
| WO | WO 2010125124 A1 * | 4/2012 | ............... B60C 1/00 |
| WO | 2015/084436 | 6/2015 | |

* cited by examiner

*Primary Examiner* — Michael M Bernshteyn
(74) *Attorney, Agent, or Firm* — Priya G. Prasad

(57) ABSTRACT

This invention relates to a process for the preparation of a silane-functionalized resin composition comprising the steps of mixing a polymer backbone, a silane, and a free radical initiator; and producing a silane-functionalized resin composition. The polymer backbone is selected from at least one of dicyclopentadiene (DCPD)-based polymers, cyclopentadiene (CPD)-based polymers, DCPD-styrene copolymers, $C_5$ homopolymers and copolymer resins, $C_5$-styrene copolymer resins, terpene homopolymer or copolymer resins, pinene homopolymer or copolymer resins, $C_9$ homopolymers and copolymer resins, $C_5/C_9$ copolymer resins, alpha-methylstyrene homopolymer or copolymer resins, and combinations thereof.

11 Claims, 1 Drawing Sheet

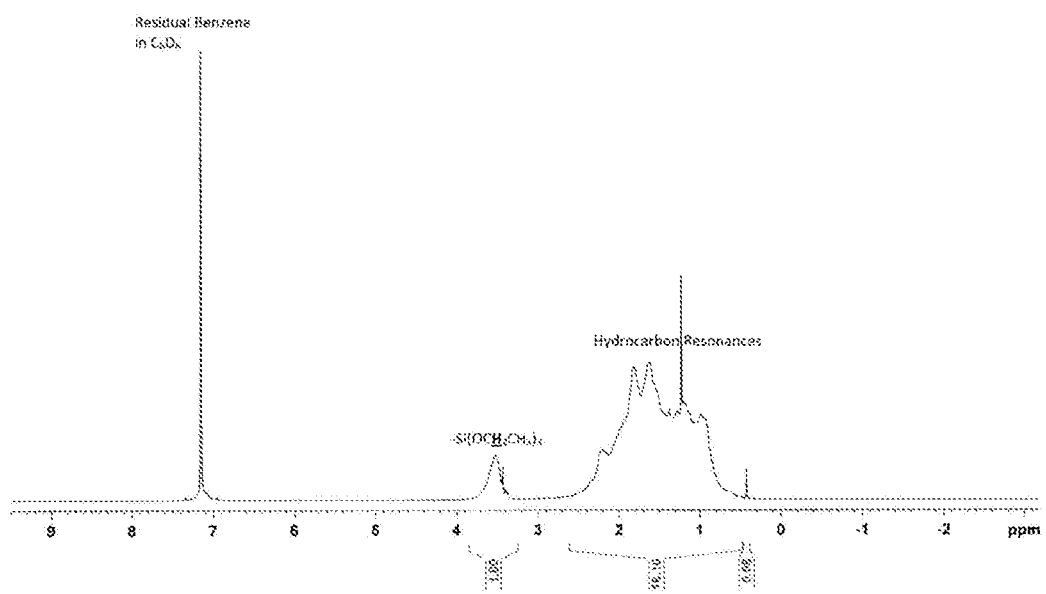

FREE RADICAL GRAFTING OF FUNCTIONALIZED RESINS FOR TIRES

CROSS REFERENCE TO RELATED APPLICATION

This application is a National Stage Application of International Application No. PCT/US2015/019200, filed Mar. 6, 2015, and claims priority to and the benefit of U.S. Provisional Patent Application No. 61/972,975, filed Mar. 31, 2014, the disclosures of which are incorporated herein by reference in their entireties.

FIELD OF THE INVENTION

This invention relates to the free radical grafting of hydrocarbon resins for use in tire compound applications.

BACKGROUND

Treads of high performance tires are expected to have outstanding traction and handling properties. Generally, tire treads are compounded with high filler loading and resins to achieve these desired properties.

For passenger tires, miscible resins are typically used in tread compound formulations in order to increase traction characteristics. Although these resins increase overall traction, tread compounds formulated with these miscible resins tend to suffer from reduced traction and handling at high speeds or at high internal tire temperatures generated during hard driving.

The problems observed in passenger tires at high speeds and temperatures have been solved by adding high softening point immiscible resins and resin blends to tread compounds for use in race car tires. For instance, it has been observed that using resin packages with high G' (storage modulus) values at high temperatures along with high tangent delta (ratio of loss modulus to storage modulus) values improve tire performance at high speeds and temperatures. However, since adding immiscible resins reduces the life of the tire tread, using immiscible resins for high performance passenger tires is not a viable option because of the increased stability and lifetime requirements of passenger tires versus those of race car tires.

Patent Application No. PCT/US 2014/050475 discloses DCPD-based functionalized resins prepared via metathesis chemistry. The catalysts used in the process of metathesis, such as ruthenium-based catalysts, pose a cost barrier when the preparation of the resins is scaled up. Accordingly, there remains a need for a functionalized resin composition that is usable for the formation of high performance tire treads which is non-extractable and that can be prepared in a cost effective manner.

SUMMARY OF THE INVENTION

The foregoing and/or other challenges are addressed by the methods and products disclosed herein.

This invention relates to a process for the preparation of a silane-functionalized resin composition comprising the steps of mixing a polymer backbone, a silane, and a free radical initiator; and producing a silane-functionalized resin composition, where the polymer backbone is selected from at least one of dicyclopentadiene (DCPD)-based polymers, cyclopentadiene (CPD)-based polymers, DCPD-styrene copolymers, $C_5$ homopolymers and copolymer resins, $C_5$-styrene copolymer resins, terpene homopolymer or copolymer resins, pinene homopolymer or copolymer resins, $C_9$ homopolymers and copolymer resins, $C_5/C_9$ copolymer resins, alpha-methylstyrene homopolymer or copolymer resins, and combinations thereof.

This invention further relates to a tire tread composition comprising the aforementioned functionalized resin composition.

BRIEF DESCRIPTION OF THE FIGURE

FIG. 1 is the hydrogen (1H) nuclear magnetic resonance (NMR) spectrum of silane-functionalized resins of the invention.

DETAILED DESCRIPTION

Various specific embodiments of the invention will now be described, including preferred embodiments and definitions that are adopted herein for purposes of understanding the claimed invention. While the illustrative embodiments have been described with particularity, it will be understood that various other modifications will be apparent to and can be readily made by those skilled in the art without departing from the spirit and scope of the invention. For determining infringement, the scope of the "invention" will refer to any one or more of the appended claims, including their equivalents and elements or limitations that are equivalent to those that are recited.

The inventors have discovered that preparing a silane-functionalized polymer backbone using free radical chemistry, results in advantageous properties for the resin for use in elastomeric compounds of high performance tires in a cost-effective manner.

The term "phr" means parts per hundred parts of rubber, and is a measure common in the art wherein components of a composition are measured relative to the total of all of the elastomer (rubber) components. The total phr or parts for all rubber components, whether one, two, three, or more different rubber components is present in a given recipe is always defined as 100 phr. All other non-rubber components are ratioed against the 100 parts of rubber and are expressed in phr.

The term "interpolymer" means any polymer or oligomer having a number average molecular weight of 500 or more prepared by the polymerization or oligomerization of at least two different monomers, including copolymers, terpolymers, tetrapolymers, etc. As used herein, reference to monomers in an interpolymer is understood to refer to the as-polymerized and/or as-derivatized units derived from that monomer. The terms polymer and interpolymer are used broadly herein and in the claims to encompass higher oligomers having a number average molecular weight (Mn) equal to or greater than 500, as well as compounds that meet the molecular weight requirements for polymers according to classic ASTM definitions.

All resin component percentages listed herein are weight percentages, unless otherwise noted. "Substantially free" of a particular component in reference to a composition is defined to mean that the particular component comprises less than 0.5 wt % in the composition, or more preferably less than 0.25 wt % of the component in the composition, or most preferably less than 0.1 wt % of the component in the composition.

The term "elastomer," as used herein, refers to any polymer or combination of polymers consistent with the ASTM D1566 definition, incorporated herein by reference.

As used herein, the term "elastomer" may be used interchangeably with the term "rubber."

Functionalized Resin

The functionalized resin molecules of the present invention are prepared via free radical chemistry methods known in the art.

Polymer Backbone

The phrase "polymer backbone" includes units derived from substituted or unsubstituted cyclopentadiene homopolymer or copolymer resins (referred to as CPD), dicyclopentadiene homopolymer or copolymer resins (referred to as DCPD or (D)CPD), terpene homopolymer or copolymer resins, $C_5$ fraction homopolymer or copolymer resins, $C_9$ fraction homopolymer or copolymer resins, alpha-methylstyrene homopolymer or copolymer resins, and combinations thereof. The polymer backbone may further include units derived from (D)CPD/vinylaromatic copolymer resins, (D)CPD/terpene copolymer resins, terpene/phenol copolymer resins, (D)CPD/pinene copolymer resins, pinene/phenol copolymer resins, (D)CPD/$C_5$ fraction copolymer resins, (D)CPD/$C_9$ fraction copolymer resins, terpene/vinylaromatic copolymer resins, terpene/phenol copolymer resins, pinene/vinylaromatic copolymer resins, pinene/phenol copolymer resins, $C_5$ fraction/vinylaromatic copolymer resins, and combinations thereof. The term "resin molecule" or "resin" as used herein is interchangeable with the phrase "polymer backbone."

The phrase "units derived from dicyclopentadiene" includes units derived from substituted DCPD such as methyl DCPD or dimethyl DCPD.

Preferably, the polymer comprising units derived from dicyclopentadiene (also referred to as the "DCPD polymer") have an Mw within the range from 150 to 10,000 g/mol (as determined by GPC), more preferably from 200 to 5,000 g/mol, most preferably from 300 to 1000 g/mol. While reference is made to a DCPD polymer, any polymer backbone comprised of units mentioned herein is suitable for the present invention.

Preferably, the polymer backbone comprises up to 100 mol % units derived from dicyclopentadiene, more preferably within the range from 5 to 90 mol % units derived from DCPD, most preferably from 5 to 70 mol % units derived from DCPD.

Preferably, the polymer backbone comprises up to 15% piperylene components, up to 15% isoprene components, up to 15% amylene components, up to 20% indene components, within the range from 60% to 100% cyclic components, and up to 20% styrenic components by weight of the monomers in the monomer mix.

Cyclic components are generally a distillate cut or synthetic mixture of $C_5$ and $C_6$ to $C_{15}$ cyclic olefins, diolefins, and dimers, co-dimers and trimers, etc., from a distillate cut. Cyclics include, but are not limited to, cyclopentene, cyclopentadiene, DCPD, cyclohexene, 1,3-cyclohexadiene, and 1,4-cyclohexadiene. A preferred cyclic is cyclopentadiene. The DCPD may be in either the endo or exo form. The cyclics may or may not be substituted. Preferred substituted cyclics include cyclopentadienes and DCPD substituted with a $C_1$ to $C_{40}$ linear, branched, or cyclic alkyl group, preferably one or more methyl groups. Preferably, the cyclic components are selected from the group consisting of: cyclopentadiene, cyclopentadiene dimer, cyclopentadiene trimer, cyclopentadiene-$C_5$ co-dimer, cyclopentadiene-piperylene co-dimer, cyclopentadiene-$C_4$ co-dimer, cyclopentadiene-methyl cyclopentadiene co-dimer, methyl cyclopentadiene, methyl cyclopentadiene dimer, and mixtures thereof.

Preferably, the polymer backbone has a refractive index greater than 1.5. Preferably, the polymer backbone has a softening point of 80° C. or more (Ring and Ball, as measured by ASTM E-28) more preferably from 80° C. to 150° C., most preferably 100° C. to 150° C.

Preferably, the polymer backbone has a glass transition temperature (Tg) (as measured by ASTM E 1356 using a TA Instruments model 2920 machine) of from −30° C. to 100° C.

Preferably, the polymer backbone has a Brookfield Viscosity (ASTM D-3236) measured at the stated temperature (typically from 120° C. to 190° C.) using a Brookfield Thermosel viscometer and a number 27 spindle of 50 to 25,000 mPa·s at 177° C.

Preferably, the polymer backbone comprises olefinic unsaturation, e.g., at least 1 mol % olefinic hydrogen, based on the total moles of hydrogen in the interpolymer as determined by $^1$H-NMR. Alternatively, the polymer backbone comprises from 1 to 20 mol % aromatic hydrogen, preferably from 2 to 15 mol % aromatic hydrogen, more preferably from 2 to 10 mol % aromatic hydrogen, preferably at least 8 mol % aromatic hydrogen, based on the total moles of hydrogen in the polymer.

Preferably, the polymer backbone comprises a DCPD polymer described in International Patent Application No. WO 2012/050658 A1.

Examples of polymer backbones useful in this invention include Escorez® resins sold by ExxonMobil Chemical Company.

Silane

As used herein, the term "silane" means any silicon analog of a substituted or unsubstituted hydrocarbon. The term "silane structure" refers to any compound, moiety or group containing a tetravalent silicon atom. Preferably, the silane useful herein is represented by either of the following formula (I) and/or (II):

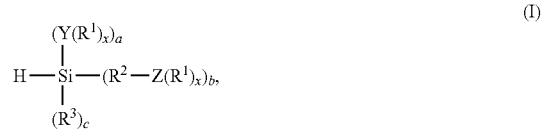

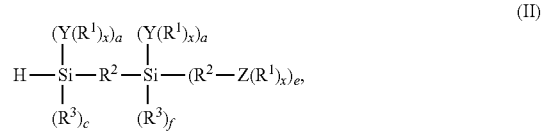

where each Y is independently a nitrogen, oxygen, or sulfur atom, each Z is independently a boron, nitrogen, oxygen, silicon or sulfur atom, each $R^1$ is independently a hydrogen atom, or a substituted or unsubstituted alkyl or aromatic group of from 1 to 20 carbon atoms, each $R^2$ is independently a divalent substituted or unsubstituted alkyl or aromatic group of from 1 to 20 carbon atoms, each $R^3$ is independently a hydrogen atom, a halogen atom, a sulfonate group, a substituted or unsubstituted alkyl or aromatic group of from 1 to 20 carbon atoms, $R^1$, $R^2$, and $R^3$ may form single or multinuclear rings with each other, a-f are independently integers of 1, 2, or 3, with the proviso that a+b+c and d+e+f are both equal to 3, and independently for each Y and Z, if Z is a boron atom, then x=2, if Y or Z is a nitrogen atom, then x=2, if Y or Z is an oxygen or sulfur atom, then x=1, if Z is a silicon atom, then x=3.

Free Radical Initiator

As used herein, the term "free radical initiator" is defined as a molecular fragment having one or more unpaired electrons.

Useful free radical initiators for the present invention include, but are not limited to peroxide type compounds, azo-type compounds, and combinations thereof. In one embodiment, the free radical initiator is a peroxide and an organic peroxide. In one embodiment, at least a methyl group or higher alkyl or aryl is bound to one or both oxygen atoms of the peroxide. In another embodiment, the free radical initiator is a sterically hindered peroxide, wherein the alkyl or aryl group associated with each oxygen atom is at least a secondary carbon, a tertiary carbon in another embodiment. Non-limiting examples of sterically hindered peroxides (also known in the art as "visbreaking agents") include 2,5-bis(tert-butylperoxy)-2,5-dimethylhexane, 2,5-dimethyl-2,5-bis-(t-butylperoxy)-hexyne-3,4-methyl-4-t-butylperoxy-2-pentanone, 3,6,6,9,9-pentamethyl-3-(ethylacetate)-1,2,4,5-textraoxy cyclononane, $\alpha,\alpha'$-bis-(tert-butylperoxy)diisopropyl benzene, and mixtures of these and any other secondary- or tertiary-hindered peroxides. A preferred peroxide is 2,5-bis(tert-butylperoxy)-2,5-dimethylhexane, commercially available as Luperox™ 101 or Trigonox™ 101. Luperox™ 101 or Trigonox™ 101 can be fed in the extruder pure in liquid form or as a masterbatch blend in mineral oil (e.g., 50/50 weight/weight blend of Trigonox™ 101/mineral oil). Another common peroxide used as a free radical initiator is di-t-amyl peroxide, commercially available as DTAP. In one embodiment, the free radical initiator may include a diazo compound, or any other compound or chemical that promotes free radicals in an amount sufficient to cause degradation as specified herein.

High Performance Tire Tread Compositions

The functionalized polymer produced by this invention can be used in a high performance tire tread composition.

The high performance tire tread composition is formed by blending the functionalized polymer produced by this invention with diene elastomer and inorganic filler. Preferably, the functionalized polymer is present within the range from 5 to 100 phr, more preferably 15 to 50 phr, most preferably 20 to 50 phr. The diene elastomer may comprise a blend of two or more elastomers. The individual elastomer components may be present in various conventional amounts, with the total diene elastomer content in the tire tread composition being expressed as 100 phr in the formulation. Preferably, the inorganic filler is present within the range from 50 to 150 phr, more preferably 50 to 100 phr, most preferably 60 to 90 phr.

Diene Elastomer

As used herein, the term "diene elastomer" is meant to refer to any viscoelastic polymer synthesized from hydrocarbon monomer comprising two carbon double bonds.

Examples of preferred diene elastomers include, but are not limited to, natural rubber, polybutadiene rubber, polyisoprene rubber, styrene-butadiene rubber, isoprene-butadiene rubber, high cis-polybutadiene, ethylene-propylene rubber, ethylene-propylene-diene rubber, nitrile rubber, butyl rubber, halogenated butyl rubber, branched ("star-branched") butyl rubber, halogenated star-branched butyl rubber, poly(isobutylene-co-p-methylstyrene), brominated butyl rubber, chlorinated butyl rubber, star-branched polyisobutylene rubber, and mixtures thereof. Blends of these diene elastomers may be reactor blends and/or melt mixes. Particularly preferred diene elastomers include polybutadiene rubber and styrene-butadiene rubber. Preferably, the styrene-butadiene rubber has a styrene content of 25 wt %.

A preferred styrene-butadiene rubber is commercially available by Lanxess as Buna™ VSL 5025-2.

Inorganic Filler

The term "filler" as used herein refers to any material that is used to reinforce or modify physical properties, impart certain processing properties, or reduce cost of an elastomeric composition.

Examples of fillers suitable for the present invention include, but are not limited to, calcium carbonate, clay, mica, silica, silicates, talc, titanium dioxide, alumina, zinc oxide, starch, wood flour, carbon black, or mixtures thereof. The fillers may be any size and typically range, for example in the tire industry, from 0.0001 µm to 100 µm.

As used herein, the term "silica" is meant to refer to any type or particle size silica or another silicic acid derivative, or silicic acid, processed by solution, pyrogenic, or the like methods, including untreated, precipitated silica, crystalline silica, colloidal silica, aluminum or calcium silicates, fumed silica, and the like. Precipitated silica can be conventional silica, semi-highly dispersible silica, or highly dispersible silica.

Coupling Agent

As used herein, the term "coupling agent" is meant to refer to any agent capable of facilitating stable chemical and/or physical interaction between two otherwise non-interacting species, e.g., between a filler and a diene elastomer. Coupling agents cause silica to have a reinforcing effect on the rubber. Such coupling agents may be pre-mixed, or pre-reacted, with the silica particles or added to the rubber mix during the rubber/silica processing, or mixing, stage. If the coupling agent and silica are added separately to the rubber mix during the rubber/silica mixing, or processing stage, the coupling agent then combines in situ with the silica.

The coupling agent may be a sulfur-based coupling agent, an organic peroxide-based coupling agent, an inorganic coupling agent, a polyamine coupling agent, a resin coupling agent, a sulfur compound-based coupling agent, oxime-nitrosamine-based coupling agent, and sulfur. Among these, preferred for a rubber composition for tires is the sulfur-based coupling agent.

In an embodiment, the coupling agent is at least bifunctional. Non-limiting examples of bifunctional coupling agents include organosilanes or polyorganosiloxanes. Other examples of suitable coupling agents include silane polysulfides, referred to as "symmetrical" or "unsymmetrical" depending on their specific structure. Silane polysulphides can be described by the formula (III):

in which x is art integer from 2 to 8 (preferably from 2 to 5); the A symbols, which are identical or different, represent a divalent hydrocarbon radical (preferably a $C_1$-$C_{18}$ alkylene group or a $C_6$-$C_{12}$ arylene group, more particularly a $C_1$-$C_{10}$, in particular $C_1$-$C_4$, alkylene, especially propylene); the Z symbols, which are identical or different, correspond to one of the three formulae (IV):

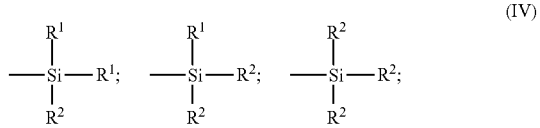

in which the $R^1$ radicals, which are substituted or unsubstituted and identical to or different from one another, represent a $C_1$-$C_{18}$ alkyl, $C_5$-$C_{18}$ cycloalkyl or $C_6$-$C_{18}$ aryl group (preferably $C_1$-$C_6$ alkyl, cyclohexyl or phenyl groups, in particular $C_1$-$C_4$ alkyl groups, more particularly methyl and/or ethyl); the $R^2$ radicals, which are substituted or unsubstituted and identical to or different from one another, represent a $C_1$-$C_{18}$ alkoxyl or $C_5$-$C_{18}$ cycloalkoxyl group (preferably a group selected from $C_1$-$C_8$ alkoxyls and $C_5$-$C_8$ cycloalkoxyls, more preferably still a group selected from $C_1$-$C_4$ alkoxyls, in particular methoxyl and ethoxy).

International Patent Application Nos. WO 03/002648 and WO 03/002649 further disclose silane polysulfides. Non-limiting examples of silane polysulphides include bis(($C_1$-$C_4$)alkoxy($C_1$-$C_4$)alkylsilyl($C_1$-$C_4$)alkyl)polysulphides (in particular disulphides, trisulphides or tetrasulphides), such as, for example, bis(3-trimethoxysilylpropyl) or bis(3-triethoxysilylpropyl)poly sulphides. Further examples include bis(3-triethoxysilylpropyl)tetrasulphide, abbreviated to TESPT, of formula $[(C_2H_5O)_3Si(CH_2)_3S_2]_2$, or bis(triethoxysilylpropyl)disulphide, abbreviated to TESPD, of formula $[(C_2H_5O)_3Si(CH_2)_3S]_2$. Other examples include bis(mono($C_1$-$C_4$)alkoxydi($C_1$-$C_4$)alkylsilylpropyl)polysulphides (in particular disulphides, trisulphides or tetrasulphides), more particularly bis(monoethoxydimethylsilylpropyl)tetrasulphide, such as described in International Patent Application No. WO 02/083782.

The coupling agent can also be bifunctional POSs (polyorganosiloxanes), or hydroxysilane polysulphides, as described in International Patent Application Nos. WO 02/30939, WO 02/31041 and WO 2007/061550, or silanes or POSs bearing azodicarbonyl functional groups, as described in International Patent Application Nos. WO 2006/125532, WO 2006/125533 and WO 2006/125534. The coupling agent can also include other silane sulphides, for example, silanes having at least one thiol (—SH) functional group (referred to as mercaptosilanes) and/or at least one masked thiol functional group, as described in U.S. Pat. No. 6,849,754, and International Patent Application Nos. WO 99/09036, WO: 2006/023815, WO2007/098080. WO 2008/055986 and WO 2010/072685.

As used herein, the term "coupling agent" includes a blend of one or more coupling agents described herein. A preferred coupling agent for the present invention includes alkoxysilane or polysulphurized alkoxysilane. A particularly preferred polysulphurized alkoxysilane is bis(triethoxysilylpropyl)tetrasulphide, which is commercially available from Degussa under the trade name X50S.

Plasticizer

As used herein, the term "plasticizer" (also referred to as a processing oil), refers to a petroleum derived processing oil and synthetic plasticizer. Such oils are primarily used to improve the processability of the composition. Suitable plasticizers include, but are not limited to, aliphatic acid esters or hydrocarbon plasticizer oils such as paraffinic oils, aromatic oils, naphthenic petroleum oils, and polybutene oils.

Antioxidant

As used herein, the term "antioxidant" refers to a chemical that combats oxidative degradation. Suitable antioxidants include diphenyl-p-phenylenediamine and those disclosed in *The Vanderbilt Rubber Handbook* (1978), Pages 344 to 346.

Crosslinking Agents, Curatives, Cure Packages, and Curing Processes

The elastomeric compositions and the articles made from those compositions are generally manufactured with the aid of at least one cure package, at least one curative, at least one crosslinking agent, and/or undergo a process to cure the elastomeric composition. As used herein, at least one curative package refers to any material or method capable of imparting cured properties to a rubber as is commonly understood in the industry.

Processing

The inventive tire tread composition may be compounded (mixed) by any conventional means known to those skilled in the art. The mixing may occur in a single step or in multiple stages. For example, the ingredients are typically mixed in at least two stages, namely at least one non-productive stage followed by a productive mixing stage. The terms "non-productive" and "productive" mix stages are well known to those having skill in the rubber mixing art. The elastomers, polymer additives, silica and silica coupler, and carbon black, if used, are generally mixed in one or more non-productive mix stages. Most preferably, the polymers are mixed first at 110° C. to 130° C. for 30 seconds to 2 minutes, followed by addition of the silica, silica coupler and other ingredients, the combination of which is further mixed, most preferably at an increasing temperature up to 140° C. to 160° C. for 30 seconds to 3 or 4 minutes. Most desirably the silica is mixed in portions, most preferably one half, then the second half. The final curatives are typically mixed in the productive mix stage. In the productive mix stage, the mixing typically occurs at a temperature, or ultimate temperature, lower than the mix temperature(s) of the preceding non-productive mix stage(s).

Example:

In an embodiment, the preparation of silane-functionalized resins according to the present invention can be illustrated, as follows:

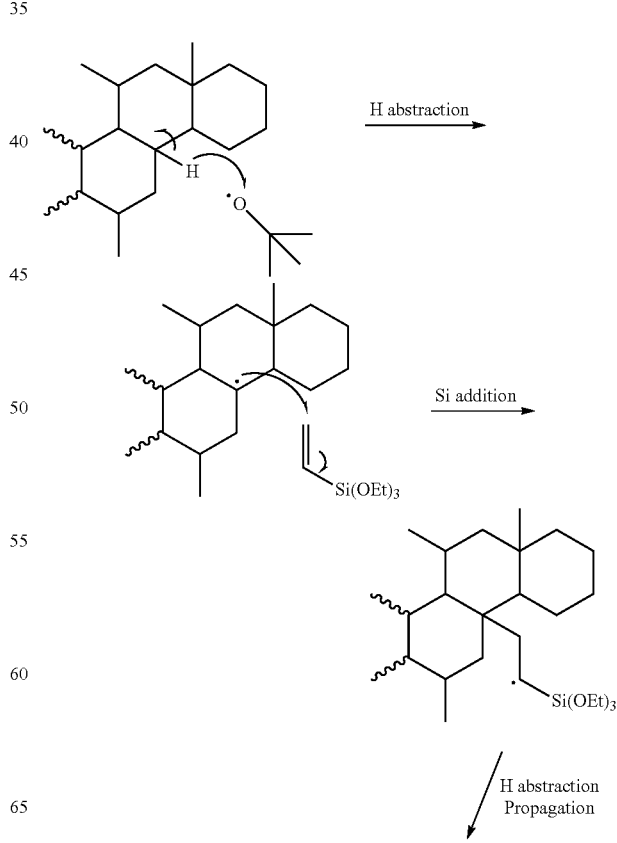

-continued

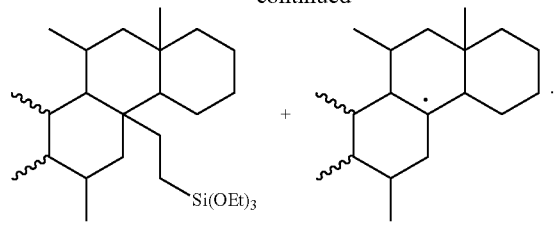

In a nitrogen-filled glove box, a 100 mL round-bottomed flask was charged with Escorez™ E5400 resin (a polymer backbone) (10 g), vinyltrimethoxysilane (a silane) (12.25 mL), toluene (a solvent) (10 mL), and a stirbar. With stirring, the solution was heated to 109° C. Luperox® DI—a tert-butylperoxide (a free radical initiator) (7.35 mL) was added dropwise to the flask. After stirring at 100° C. for 16 hours, the mixture was cooled and volatiles were removed by filtration. The samples were characterized by 1H NMR spectroscopy.

FIG. 1 is the 1H NMR spectrum of the silane-functionalized E5400 resin described in the example above. The broad signal visible at approximately δ 3.4-3.7 ppm (relative to the benzene resonance, calibrated at δ 7.15 ppm) indicates that the siloxy moieties chemically bonded to the hydrocarbon resin. This resonance is distinct from the silane starting material (not shown), and its broadness is indicative of the variety of chemical environments that have been functionalized with the silane group.

INDUSTRIAL APPLICABILITY

The compositions of the invention may be extruded, compression molded, blow molded, injection molded, and laminated into various shaped articles including fibers, films, laminates, layers, industrial parts such as automotive parts, appliance housings, consumer products, packaging, and the like.

In particular, the compositions comprising the resin are useful in a variety of tire applications such as truck tires, bus tires, automobile tires, motorcycle tires, off-road tires, aircraft tires, and the like. Such tires can be built, shaped, molded, and cured by various methods which are known and will be readily apparent to those having skill in the art. The compositions may be fabricated into a component of a finished article for a tire. The component may be any tire component such as treads, sidewalls, chafer strips, tie gum layers, reinforcing cord coating materials, cushion layers, and the like.

The compositions comprising the resin of the present invention are useful in a variety of applications, such as tire curing bladders, inner tubes, air sleeves, hoses, belts such as conveyor belts or automotive belts, solid tires, footwear components, rollers for graphic arts applications, vibration isolation devices, pharmaceutical devices, adhesives, caulks, sealants, glazing compounds, protective coatings, air cushions, pneumatic springs, air bellows, accumulator bags, and various bladders for fluid retention and curing processes. They are also useful as plasticizers in rubber formulations; as components to compositions that are manufactured into stretch-wrap films as dispersants for lubricants; and in potting and electrical cable filling and cable housing materials.

The compositions comprising the resin may also be useful in molded rubber parts and may find wide applications in automobile suspension bumpers, auto exhaust hangers, and body mounts. In yet other applications, compositions of the invention are also useful in medical applications such as pharmaceutical stoppers and closures and coatings for medical devices.

Certain embodiments and features have been described using a set of numerical upper limits and a set of numerical lower limits. It should be appreciated that ranges from any lower limit to any upper limit are contemplated unless otherwise indicated. Certain lower limits, upper limits, and ranges appear in one or more claims below. All numerical values are "about" or "approximately" the indicated value, and take into account experimental error and variations that would be expected by a person having ordinary skill in the art.

To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

The invention claimed is:

1. A process for the preparation of a silane-functionalized resin composition, comprising the steps of:
    (A) mixing a polymer backbone, a silane, and a free radical initiator; and
    (B) producing a silane-functionalized resin composition, wherein the polymer backbone has a softening point from 80° C. to 150° C. and comprises:
        (i) within the range from 60 to 100 wt % cyclic components;
        (ii) less than or equal to 15 wt % components derived from piperylene;
        (iii) less than or equal to 15 wt % components derived from amylene;
        (iv) less than or equal to 15 wt % components derived from isoprene;
        (v) less than or equal to 20 wt % components derived from styrene; and
        (vi) less than or equal to 20 wt % components derived from indene,
    and wherein the silane is (i) vinyltrimethoxysilane and/or (ii) of the formula (I) and/or (II);

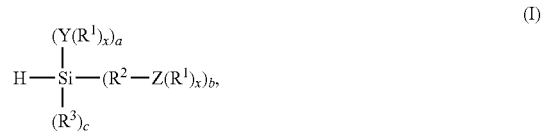

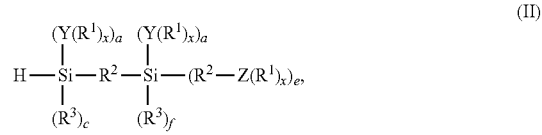

where each Y is independently a nitrogen, oxygen, or sulfur atom, each Z is independently a boron, nitrogen, oxygen, silicon or sulfur atom, each $R^1$ is independently a hydrogen atom, or a substituted or unsubstituted alkyl or aromatic group of from 1 to 20 carbon atoms, each $R^2$ is independently a divalent substituted or unsubstituted alkyl or aromatic group of from 1 to 20 carbon atoms, each $R^3$ is independently a hydrogen atom, a halogen atom, a sulfonate group, a substituted or unsubstituted alkyl or aromatic group of from 1 to 20 carbon atoms, $R^1$, $R^2$, and $R^3$ may form single or multinuclear rings with each other, a-f are independently integers of 1, 2, or 3, with the proviso that a+b+c and d+e+f are both equal to 3, and independently for each Y and Z, if Z is a boron atom, then x=2, if Y or Z is a nitrogen atom, then x=2, if Y or Z is an oxygen or sulfur atom, then x=1, if Z is a silicon atom, then x=3.

2. The process of claim 1, wherein the free radical initiator is selected from the group consisting of organic peroxide, azobisisbutyronitrile), 1,1'-azobis(cyclohexanecarbonitrile), 4,4'-azobis(4-cyanovaleric acid), 2,2'-azobis(2-methylpropionamidine) dihydrochloride, 2,2'-azobis(2-methylbutyronitrile), 2,3-dimethyl-2,3-diphenylbutane, 1,1-diphenyl-2,2-diethylcyclopropane, 2,2,3,3-tetraphenylbutane, sodium, potassium, or ammonium persulfate, hydroxymethanesulfinic acid monosodium salt dihydrate, acetophenone, benzil, benzoin, benzophenone, thioxanthones, and combinations thereof.

3. A tire tread composition comprising:
(i) a functionalized resin composition within the range from 5 to 100 phr;
(ii) 100 phr of a diene elastomer; and
(iii) an inorganic filler is within the range from 50 to 150 phr,
wherein the functionalized resin comprises the reaction product of a polymer backbone, a silane, and a free radical initiator, where the polymer backbone comprises:
(i) within the range from 60 to 100 wt % cyclic components;
(ii) less than or equal to 15 wt % components derived from piperylene;
(iii) less than or equal to 15 wt % components derived from amylene;
(iv) less than or equal to 15 wt % components derived from isoprene;
(v) less than or equal to 20 wt % components derived from styrene; and
(vi) less than or equal to 20 wt % components derived from indene,
and wherein the silane is (i) vinyltrimethoxysilane and/or (ii) of the formula (I) and/or (II):

(I)

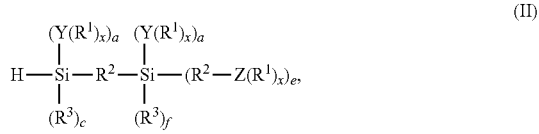

(II)

where each Y is independently a nitrogen, oxygen, or sulfur atom, each Z is independently a boron, nitrogen, oxygen, silicon or sulfur atom, each $R^1$ is independently a hydrogen atom, or a substituted or unsubstituted alkyl or aromatic group of from 1 to 20 carbon atoms, each $R^2$ is independently a divalent substituted or unsubstituted alkyl or aromatic group of from 1 to 20 carbon atoms, each $R^3$ is independently a hydrogen atom, a halogen atom, a sulfonate group, a substituted or unsubstituted alkyl or aromatic group of from 1 to 20 carbon atoms, $R^1$, $R^2$, and $R^3$ may form single or multinuclear rings with each other, a-f are independently integers of 1, 2, or 3, with the proviso that a+b+c and d+e+f are both equal to 3, and independently for each Y and Z, if Z is a boron atom, then x=2, if Y or Z is a nitrogen atom, then x=2, if Y or Z is an oxygen or sulfur atom, then x=1, if Z is a silicon atom, then x=3.

4. The tire tread composition of claim 3, wherein the polymer backbone is selected from at least one of dicyclopentadiene (DCPD)-based polymers, cyclopentadiene (CPD)-based polymers, DCPD-styrene copolymers, $C_5$ homopolymers and copolymer resins, $C_5$-styrene copolymer resins, terpene homopolymer or copolymer resins, $C_9$ homopolymers and copolymer resins, $C_5/C_9$ copolymer resins, alpha-methylstyrene homopolymer or copolymer resins, and combinations thereof.

5. The tire tread composition of claim 3, wherein the free radical initiator is selected from the group consisting of organic peroxide, azobisisbutyronitrile), 1,1'-azobis(cyclohexanecarbonitrile), 4,4'-azobis(4-cyanovaleric acid), 2,2'-azobis(2-methylpropionamidine) dihydrochloride, 2,2'-azobis(2-methylbutyronitrile), 2,3-dimethyl-2,3-diphenylbutane, 1,1-diphenyl-2,2-diethylcyclopropane, 2,2,3,3-tetraphenylbutane, sodium, potassium, or ammonium persulfate, hydroxymethanesulfinic acid monosodium salt dihydrate, acetophenone, benzil, benzoin, benzophenone, thioxanthones, and combinations thereof.

6. The tire tread composition of claim 3, wherein the inorganic filler comprises silica.

7. The tire tread composition of claim 3, wherein the diene elastomer is selected from the group consisting of natural rubber, polybutadiene rubber, polyisoprene rubber, styrene-butadiene rubber, isoprene-butadiene rubber, high cis-polybutadiene, ethylene-propylene rubber, ethylene-propylene-diene rubber, nitrile rubber, butyl rubber, halogenated butyl rubber, branched ("star-branched") butyl rubber, halogenated star-branched butyl rubber, poly(isobutylene-co-p-methylstyrene), brominated butyl rubber, chlorinated butyl rubber, star-branched polyisobutylene rubber, and mixtures thereof.

8. The tire tread composition of claim 7, wherein the diene elastomer comprises a mixture of polybutadiene rubber and styrene-butadiene rubber.

9. The tire tread composition of claim 3, further comprising a coupling agent.

10. The tire tread composition of claim 3, wherein the composition is cured.

11. A tire comprising the tire tread composition of claim 3.

* * * * *